United States Patent [19]
Bortnick et al.

[11] 3,853,968
[45] Dec. 10, 1974

[54] VINYL HALIDE POLYMER IMPACT MODIFIER

[75] Inventors: Newman M. Bortnick, Oreland; Warren D. Niederhauser, Meadowbrook; Leonard H. Smiley, Jenkintown, all of Pa.

[73] Assignee: Rohm and Haas Company, Philadelphia, Pa.

[22] Filed: Sept. 7, 1973

[21] Appl. No.: 396,269

Related U.S. Application Data

[60] Division of Ser. No. 201,205, Nov. 21, 1971, Pat. No. 3,793,406, which is a continuation-in-part of Ser. No. 91,223, Nov. 19, 1970.

[52] U.S. Cl. ............................ 260/876 R, 260/884
[51] Int. Cl. ........................................... C08f 29/24
[58] Field of Search ....................... 260/876 R, 884

[56] References Cited
UNITED STATES PATENTS

| | | | |
|---|---|---|---|
| 3,426,101 | 2/1969 | Ryan et al. | 260/876 R |
| 3,475,516 | 10/1969 | Bauer et al. | 260/876 R |
| 3,632,672 | 1/1972 | Kuhne et al. | 260/876 R |
| 3,657,172 | 4/1972 | Gallagher et al. | 260/29.6 RB |
| 3,755,514 | 11/1973 | Amagi et al. | 260/876 R |

Primary Examiner—Paul Lieberman
Attorney, Agent, or Firm—Michael B. Fein

[57] ABSTRACT

A four stage, sequentially produced polymer comprises (A) a rubbery, first stage polymer formed by emulsion polymerization of a monomer charge to 70 to 99.9 weight percent of an alkylacrylate compound, 0 to 30 weight percent of an vinylaromatic monomer interpolymerizable therewith, and 0.1 to 10 weight percent of a polyfunctional cross-linking monomer based on the weight of the monomer charge;

B. a second stage polymer formed by emulsion polymerizing in the presence of the polymer stage (A), a second monomer charge of 70 to 99.9 weight percent of a vinylaromatic monomer from 0 to 30 weight percent of alkyl acrylate, wherein the alkyl group of the alkyl acrylate has about 2 to 8 carbon atoms, interpolymerizable therewith, and 0.1 to 10 weight percent of a second polyfunctional cross-linking agent.

C. a third stage polymer formed by emulsion polymerization in the presence of the Stage (A), Stage (B) polymer product, and comprising 80 to 100 weight percent of an alkyl methacrylate, wherein the alkyl group has about 1 to 4 carbon atoms; and D. a fourth stage polymer formed by the emulsion polymerization in the presence of the Stage (A), Stage (B) and Stage (C) polymer product, and comprising from 80 to 100 weight percent of a vinyl halide.

Preferably the polymer is used as a modifier for vinyl halide polymers. When so used, the refractive index of Stage (A) + (B) + (D) is substantially equal to the refractive index of the modified vinyl halide polymer + Stage (C) of the modifier.

5 Claims, No Drawings

VINYL HALIDE POLYMER IMPACT MODIFIER

This is a continuation, division, of application Ser. No. 201,205 filed Nov. 21, 1971, now Pat. No. 3,793,406 which is a continuation in part of our earlier copending application Ser. No. 91,223, filed Nov. 19, 1970.

THE DISCLOSURE

Vinyl halide polymers are a class of materials well known in the art, and are widely used for their excellent balance of physical properties, economy, and availability. Included are homopolymers and copolymers of vinyl halides generally, and particularly the polymers and copolymers of vinyl chloride. The copolymers contemplated in the art by the expression vinyl halide copolymers typically comprise the polymers resulting from the polymerization of a monomer mixture comprising at least 80 percent by weight of a polyvinyl halide with up to about 20 percent by weight of another monovinylidene compound copolymerizable therewith, such as vinyl acetate, vinylidene chloride and propylene, or the like.

Rigid and semi-rigid or lightly plasticized vinyl products and compositions have had an impressive growth in the plastics industry during the last few years. In part at least, this growth has been facilitated by the advent and commercialization of modifiers for vinyl chloride resins which have the ability to improve processing characteristics, increase impact strength, and develop other useful utilities in the basic vinyl chloride resin system. The present invention relates to a four-page sequentially produced graft polymer which imparts improved impact resistance and clarity to vinyl halide polymer compositions.

Itimeri, U.S. Pat. No. 3,288,886, shows vinyl halide polymer compositions containing a graft copolymer of a rubbery polymer of butadiere or butadiene and styrene and monomers of styrene and methyl methacrylate where the graft copolymer is produced by completely polymerizing the styrene in the presence of an aqueous dispersion of the rubbery polymer followed by polymerization of the methyl methacrylate.

Ryan et al., U.S. Pat. No. 3,426,101, discloses polymers produced by the sequential polymerization of (1) alkyl esters of acrylic acid (2) styrene and (3) lower alkyl esters of methacrylic acid and high impact-resistant and transparent materials which result from blending such products with homopolymers and copolymers of vinyl chloride.

Bauer et al. (U.S. Pat. No. 3,475,516) have disclosed transparent and impact resistant blends of clear resinous polymers and clear rubbery polymers, made partly compatible with each other by grafting to one of the polymers a clear grafting polymer of the same polarity and cohesive energy density as the non-grafted polymer. This patentee is concerned with copolymers and homopolymers, as contrasted with the 4-stage heteropolymers taught here. Bauer discloses neither the use of vinyl chloride as his "clear grafting polymer" or polyvinyl chloride as the resinous continuous phase. This patentee is clearly limited to a teaching of the polymerization of monomers onto resinous polymers and rubbery copolymers. The compatibility of the resinous polymer with the rubbery polymer being adjusted by modifying one of the said polymers by means of a clear grafting polymer grafted to said one polymer.

It has been found in the present invention, that modifiers for vinyl halide polymers can be made by first forming a rubbery core of a polyacrylate compound, particularly polybutyl acrylate; then forming a second stage on/or within the core and comprising a vinyl aromatic, especially polystyrene, and then forming a third stage comprising an alkyl methacrylate on the two-stage heteropolymer, and finally forming a fourth stage within the stage 1 and 2 and comprising a vinyl halide. It has been found that vinyl halide polymers containing these novel modifiers are characterized by improved impact resistance and clarity.

The present invention relates to a process for making this sequential, emulsion polymerized modifier, compositions of the resulting modifiers and vinyl halide polymers containing the modifier. The process comprises the steps: (A) forming a rubbery, polymer stage by emulsion polymerization of a monomer charge of 70 to 99.9 weight percent of an alkyl acrylate wherein the alkyl group of the alkyl acrylate has 2 to 8 carbon atoms, 0 to 30 weight percent of a vinyl aromatic monomer interpolymerizable therewith, and 0.1 to 10 weight percent of a polyfunctional crosslinking monomer based on the weight of the monomer charge; weights based on the total of the step (A) monomer charge; (B) adding to the resulting rubbery polymer stage produced in Step (A), a second monomer charge 70 to 99.9 weight percent of a vinylaromatic monomer, 0 to 30 weight percent of an alkyl acrylate interpolymerizable therewith, and 0.1 to 10 weight percent of a polyfunctional cross-linking monomer, weights based on the total weight of the Step (B) monomer charge; and emulsion polymerizing the second monomer charge to form a polymer stage on/or within the first stage; (C) adding to the resulting polymers produced in Steps (A) and (B), a third monomer charge of 80 to 100 weight percent of an alkyl methacrylate wherein the alkyl group has about 1 to 4 carbon atoms, weight based on the total weight of the Step (C) monomer charge; emulsion polymerizing the third monomer charge to form a third stage polymer on the polymers produced by Steps (A) and (B); and (D) adding to the resulting polymers produced in Steps (A), (B), and (C) a fourth monomer charge of from 80 to 100 weight percent of a vinyl halide; and emulsion polymerizing same.

The composition is a four-stage, sequentially produced polymer comprising (a) a first-stage polymer formed by emulsion polymerization of a monomer charge of 70 to 99.9 weight percent of an alkyl acrylate compound, 0 to 30 weight percent of a vinyl aromatic monomer interpolymerizable therewith, and 0.1 to 10 weight percent of a polyfunctional cross-linking monomer based on the weight of the monomer charge; (b) a second stage polymer formed by emulsion polymerizing in the presence of the first stage polymer (a), a second monomer charge of 70 to 99.9 weight percent of a vinyl aromatic monomer, 0 to 30 weight percent of an alkyl acrylate monomer, the alkyl group of the alkyl acrylate has about 2 to 8 carbon atoms interpolymerizable therewith, and 0.1 to 10 weight percent of a polyfunctional cross-linking agent, weights based on the total weight of the Step (B) monomer charge; and (C) a third stage polymer formed by emulsion polymerization in the presence of the Stage (A), and Stage (B) polymer product and comprising 80 to 100 weight percent of an alkyl methacrylate wherein the alkyl group has about 1 to 4 carbon atoms, based on the total weight of the Step (C) monomer charge; and (D) fourth stage polymer formed by the emulsion polymerization in the presence of the Stage (A), Stage (B) and Stage (C) polymer product; but polymerized primarily within Stage (A) and Stage (B) and comprising from 80 to 100 weight percent of a vinyl halide.

The compositions of vinyl halide polymer containing the modifier comprise about 98 to 60 weight percent poly (vinyl halide), and about 2 to 40 weight percent of the fourth stage, sequentially produced heteropolymer described above. It is further characterized in that the refractive index of the sum of the first, second and fourth stages is substantially equal to the refractive index of the poly (vinyl halide) plus the polyalkyl methacrylate from the third stage of the modifier.

It will be demonstrated later herein that the effect of Stage (D) on Stages (A) and (B) is such that it does not materially alter their refractive indices.

The effect of the poly (vinyl chloride) stage of the modifier is to reduce or eliminate the possibility of any PBA* or PS** in the modifier from being forced into the modified PVC in which they are incompatable and in which they therefore will cause haze. The PMMA on the modifier is compatable with the PVC, and is expected to be removed from the modifier on processing and flow into the modified PVC (continuous phase).

*Polybutyl acrylate  **Polystyrene

In the first stage of the process, an alkyl acrylate compound such as n-butyl acrylate containing a small amount of a cross-linking monomer, preferably polyfunctional monomers, such as 1,3-butanediol dimethacrylate, diallyl maleate, or allyl methacrylate, which is polymerized to form a polymer product, that forms the core for the polymerization of the succeeding stages. The polymerization is conducted in the presence of a suitable emulsifier and an initiating system.

Suitable monomers for forming the first stage include alkyl acrylates containing 2 to 8 carbon atoms in the alkyl group.

The alkyl group can be a straight or branched chain. Preferred alkyl acrylate are n-butyl acrylate, 2-ethylhexyl acrylate, ethyl acrylate, isobutyl acrylate and 2-methoxy-ethyl acrylate. Polymers formed in this stage must have a glass transition temperature of −22°C. or below (e.g., −35°C., −40°C., etc.). Although suitably 70 to 100 weight percent of the Step (a) monomer consists of alkyl acrylate, 85 to 100 weight percent is a preferred range.

Part of the alkyl acrylate, or corresponding monomer, up to a maximum of about 30 percent by weight, can be replaced with a non-cross-linking (with respect to the alkyl acryalte or corresponding monomer) aromatic monomer interpolymerizable therewith. Examples of such monomers interpolymerizable or copolymerizable with the monomers of this stage are α-methyl styrene, chlorostyrene, styrene, and the like. If a vinyl aromatic monomer is included among the monomers polymerized in Step (a), preferably the vinyl aromatic monomer is preferably present in quantity of 5 to 15 weight percent of the total weight of monomers in the Step (a) charge.

The first stage monomer mixture may also contain a cross-linking bi- or polyfunctional monomer. Again the range of 0.1 to 10.0 percent by weight of the cross-linking monomer based on the weight of the first stage monomer mixture is satisfactory with 0.2 to 4.0 percent by weight being preferred whenever a cross-linking monomer is included.

Suitable cross-linkers include the divinyl esters of di- or tribasic acids, such as divinyl adipate; dialkyl esters of polyfunctional acids, such as dialkyl phthalate; diallyl esters such as diallyl maleate, or diallyl fumarate; divinyl esters of polyhydric alcohols, such as the divinyl ether of ethylene glycol; and di- and tri- methacrylate and acrylic esters of polyhydric alcohols; for example, ethylene glycol dimethacrylate, propylene glycol dimethacrylate, 1,3-butylene glycol dimethacrylate, 1,4-butylene glycol dimethacrylate, 1,3-butadienediol dimethacrylate (BDDMA), and mixtures of any of the foregoing.

In the second process stage, a vinyl aromatic compound is added which is readily polymerizable in emulsion by free radical techniques. Styrene is preferred, but ring substituted styrenes, such as vinyl toluene, p-isopropylstyrene, 3,4-dimethylstyrene, etc., as well as halogen substituted derivatives such as p-bromostyrene, 3,4-dichlorostyrene, etc. can also be used. Although suitably 70 to 100 weight percent of the second step (B) monomer consists of a vinyl aromatic compound, 85 to 100 weight percent is a preferred range.

Part of the sytrene (or ring substituted sytrene), up to a maximum of about 30 percent by weight, can be replaced with a non-cross-linking (with respect to the styrene) alkyl acrylate monomer interpolymerizable therewith. Examples of alkyl acrylates monomers interpolymerizable or copolymerizable with the styrene are acrylic acid esters. If an alkyl acrylate monomer is included among the monomers polymerized in Step (B), preferably the acrylate monomer is present in quantities of 5 to 15 weight percent of the total weight of monomers in the step (B) charge.

A cross-linking, bi- or polyfunctional monomer may be used in the second stage to cross-link the styrene or similar material. The range of 0.1 to 10.0 percent by weight of the cross-linking monomer based on the styrene is satisfactory, with 0.2 to 4.0 percent by weight being preferred. Cross-linkers that can be used in the present invention include divinyl esters of di- or tribasic acids, such as divinyl adipate; dialkyl esters of polyfunctional acids such as dialkyl phthalate; diallyl esters of polyfunctional acids, such as diallyl maleate and diallyl fumarate; divinyl ethers of polyhydric alcohols, such as divinyl ether of ethylene glycol; and di- and tri- methacrylic and acrylic esters polyhydric alcohols; for example, ethylene glycol dimethacrylate, propylene glycol dimethacrylate, 1,3-butylene glycol dimethacrylate, 1,4-butylene glycol dimethacrylate; etc., and mixtures of any of the foregoing. Additional cross-linking monomers, can be polyfunctional aromatic compounds such as divinyl benzene, and the like.

This second stage polymerization forms a polymer on or within the polymer formed by the first stage polymerization. During the second stage, additional initiator may be added, but essentially no new, additional and distinct particles are produced.

After completion of the second stage polymerization, a lower alkyl methacrylate is added and polymerized in the presence of the two stage emulsion; essentially no new additional and distinct particles are formed in this stage. More initiator may be used if desired.

The preferred alkyl methacrylate for the third stage is methyl methacrylate, but generally, any lower alkyl ester of methacrylic acid in which the lower alkyl group has a value of $C_1$ to $C_4$ may be used. Preferably, the lower alkyl methacrylate monomer used is one the homopolymer or copolymer of which has a glass transition temperature of 60°C. or higher. Suitable examples, in addition to methyl methacrylate, are ethyl methacrylate, isopropyl methacrylate, secbutyl methacrylate, tert-butyl methacrylate, isobornyl methacrylate and the like. The hard phase polymeric methacrylate comprises a cover or layer for the inner mass.

It is important that this methyl methacrylate monomer-containing third stage have a viscosity average molecular weight in the range of 25,000 to one million. Preferably the molecular weight is 50,000 to 500,000. Although suitably 80 to 100 weight percent of the Step (C) monomers consists of alkyl methacrylate, 90 to 100 weight percent is a preferred range.

Part of the lower alkyl methacrylate, up to a maximum of about 20 percent by weight, can be replaced with a non-cross-linking monomer interpolymerizable therewith. Examples of monomers interpolymerizable or copolymerizable with the lower alkyl methacrylate are acrylonitrile, vinyl esters, alkyl acrylic esters, methacrylic and acrylic acids, styrene and the like. If a monovinylidene monomer is included among the monomers polymerized in Step (C), preferably the monovinylidene monomer is present in quantities of 0 to 10 weight percent of the total weight of monomers in the Step (C) charge.

The third stage monomer mixture may also contain a cross-linking bi- or polyfunctional monomer such as that used in the first stage. After completion of the third stage polymerization, a fourth monomer charge of 80 to 100 weight percent of a vinyl halide monomer is introduced. The halide, preferably vinyl chloride, is added and polymerized in the presence of the three-stage emulsion latex and suitable catalyst. Comonomers such as vinyl acetate or vinylidene chloride, and mixtures thereof may be usefully employed in a range of 0 to 20 weight percent.

Essentially no new or additional and distinct particles are formed in this stage. The polymerization of the VC* is conducted within the particle and acts so as to entangle or graft into the first two stages, thus decreasing the amount of uncrosslinked, extractable poly butylacrylate and polystyrene. The amount of extractable, free, PMMA is unaffected.

*Vinyl chloride

More initiator is preferably added, stagewise, after the halide introduction, while maintaining the vessel pressure within prescribed limits. The resultant solid, polymeric product may be isolated from the emulsion by evaporation, by suitable coagulation and washing, such as by salt coagulation, freezing, etc., or it may be isolated as by spray drying.

Any of a variety of common emulsifiers well known in the art for emulsion polymerization of styrene, acrylates, and methacrylates can be used in the present invention. A low level of emulsifier is desirable, preferably below one percent by weight of long chain amines, salts of long chain carboxylic and sulfonic acids, etc. In general, the emulsifier should be compounds containing hydrocarbon groups 8–22 carbon atoms coupled to high polar solubilizing groups such as alkali metal and ammonium carboxylate groups, sulfate half ester groups, sulfonate groups, phosphate partial ester groups and the like.

The polymerization medium in each stage or step may be a free radical generating polymerization initiator, which is activated either thermally or by an oxidation-reduction (redox) reaction. The preferred initiators are those which are the result of redox reactions, since they allow rapid polymerization at low reaction temperatures. Examples of suitable initiators are combinations such as cumene hydroperoxide-sodium metabisulfite, diisopropylbenzene hydroperoxide (DIBHP), sodium formaldehyde sulfoxylate (FORMOPON), tertiary butyl peracetate, sodium hydrosulfite, cumene hydroperoxide-sodium formaldehyde sulfoxylate, etc. Water-soluble initiators may be also used, although less desirable; examples of such initiators or initiator combinations are sodium persulfate, potassium persulfate-sodium formaldehyde sulfoxylate, etc.

In order to achieve the improved transparency of the present invention, the refractive index of the first two stages plus the fourth stage of the modifier is substantially matched to that of the refractive index of the vinyl halide polymer plus the third stage of the modifier. Generally, this is achieved by utilizing relative proportions of the major constituents of the modifier within the range of 20 to 45 parts of the first Stage (A) monomers, 20 to 35 parts of the second Stage (B) monomers; and 20 to 35 parts of the third stage (C) monomer, and 6 to 90 parts of the fourth Stage (D) monomer, all parts being by weight, and by polymerizing the vinyl chloride within the first two stages of the modifier. A preferred range is 25 to 33 parts first stage monomers, 25 to 33 parts of the second stage rubbery polymer forming monomers, 25 to 33 parts of the third stage monomers, and 6 to 20 parts of the fourth stage monomer, all parts being by weight.

One important feature of the present invention is the average particle size of the sequentially produced polymer which should be at least smaller than about 3,000 A in diameter. It has been found that sheets of polyvinyl halide compositions containing the modifiers of the present invention are hazy or opaque if the particle size of the modifiers is greater than about 1,100 A. If clear polyvinyl halide sheets are desired, this particle size limitations takes on a critical aspect. Preferably the range of particle size diameters is from 700 to 1,100 A. Otherwise if a hazy or opaque sheet is useable in the particular application contemplated, a suitable range of particle size diameters for modifiers of the present invention is 700 to 3,000 A.

Particle size of the compositions of this invention may be controlled by controlling the size of the first stage particles. Control of particle size in the first stage is achieved by rapid agitation to cause dispersion of catalyst. Emulsifier and/or catalyst may also be used to control the first stage particle size.

The thermoplastic vinyl halide polymers utilized in the preferred embodiment of the present invention are the polymers and copolymers of vinyl halides, preferably chlorides, widely utilized in the production of plastic articles. These polymers are referred to as vinyl halide or vinyl chloride polymers in the present invention, and for most all uses must be modifiers compounded or copolymerized with other materials to provide processable and useful compositions. For the purpose and scope of this specification the term "vinyl chloride polymers" or "compositions" will include all compositions which have vinyl chloride or other halide as the major (greater than 50 percent) component monomer.

The compositions include, but are not limited to: poly(vinyl chloride) [PVC], copolymers of vinyl chloride with other monomers that include vinyl alkanoates such as vinyl acetate and the like, vinylidene halides such as vinylidene chloride, alkyl esters of carboxylic acids such as acrylic acid, ethyl acrylate, 2-ethylhexyl acrylate and the like, unsaturated hydrocarbons such as ethylene, propylene, isobutylene and the like, allyl compounds such as allyl acetate and the like; for flexibility vinyl halide polymers are often compounded with plasticizers such as dioctyl phthalate, poly(propylene adipate) and the like, and other modifiers such as chlorinated polyethylene); and many other materials are often included. The molecular weight and molecular weight distribution of the polymers is not critical to the aims, purposes and results of using this invention. For general applications vinyl chloride polymers with Fikentscher K-values in the range of 40 to 95, preferably about 50 to 75, are generally used. The Fikentscher K-value is determined by the formula $$\text{Log } [n] \text{ rel}/C = 75 \times 10^{-6} K^2 / 1 + 1.5 \times 10^{-3} KC + 10^{-3} K$$

where C is 0.5 gm/100 ml. concentration of polymer in solvent,

[n] rel is relative viscosity in cyclohexanone at 25°C. and

K is Fikentscher value.

When copolymers of vinyl chloride are utilized in the practice of the present invention, it is usually preferable to utilize a polymer containing from 0 to 15 weight percent of comonomer. The preferred comonomer is preferably the vinyl alkanoate, and is most preferably vinyl acetate. The most preferable copolymer contains up to 10 weight percent of the comonomer, with the remainder being vinyl chloride.

The copolymers of vinyl chloride and another monomer, mentioned above, are often softer than homopolymers of vinyl chloride.

Finally, the most preferred polymer, and the polymer which is most effectively modified by the composite interpolymers of the present invention is the homopolymer of vinyl chloride.

The above copolymers vary in physical characteristics such as viscosity, and molecular weight. The copolymers generally are of slightly lower molecular weights than PVC. Also, the viscosity values are often slightly lower, although generally within the above range. These differences however, are not limiting to the present invention which is directed to modifying such polymers and not the polymers themselves. The polymers, however, as is obvious, must be suitable for the use desired when modified, and physically must be of a type to which the present modifiers can be added.

Blends of the modifier and the vinyl halide polymer can be accomplished by any convenient technique. Entirely satisfactory blends can be accomplished on a roll mill at convenient and customary operating conditions, such as about 350°F. in about 5 to 15 minutes time. Dry mixing techniques, as with a mechanical mixer-blender device, can also be employed. The powder blends can, if desired, be processed in commercial extrusion equipment at conditions varying with the molecular weight of the polyvinyl halide used and the equipment employed for that purpose.

Certain processing aids, stabilizers, etc. are often incorporated in the blends. The stabilizers, which serve to prevent the breakdown of the polyvinyl chloride, are of several different types commonly available and well known in the art. Some help to stabilize against heat degradation; some against ultra-violet light, etc. Typically, such stabilizers are based upon tin, barium or cadmium compounds. In those situations where clarity is not necessary, common pigments may be incorporated in the modifier-vinyl halide polymer systems.

To assist those skilled in the art in the practice of the present invention, the following modes of operation are set forth as illustrations, parts and percentages being by weight unless otherwise noted.

EXAMPLE I

PREPARATION OF CANDIDATE MODIFIER L*

To a large (50 gal.) reaction vessel equipped with stirrer, degassing tube, thermometer, and addition funnel are charged in the order following: 100 kg. distilled water, 384 g. of a 20 percent aqueous solution of sodium lauryl sulfate, (SIPON WD), 18.0 ml. acetic acid, 17 kg. of n-butyl acrylate (BA) 405 g. styrene, and 187.6 g. 1,3-butanediol dimethylacrylate. The mixture is sparged with nitrogen for two hours, and the temperature is adjusted to 30°C. The initial catalyst (46.8 gm. of DIBHP) is followed by 50.7 gm. of FORMOPON in 500 gm. of distilled water. An exotherm occurs and reaches a peak temperature of 49°C. over 35 minutes.

*BA/S/BDDMA//S/BA/DVB//MMA//VC=3/5/0.48//45/5/0.5//50//16

The temperature of the reaction emulsion is maintained at this peak for a period of 15 additional minutes. An additional 49 gm. of FORMOPON catalyst in 500 g. deionized water is added. The diluted emulsion is sparged with nitrogen for 90 minutes, allowing the reaction mixture to exotherm. Styrene (39 mg.), n-butyl acrylate (4.33 lbs.), Divinyl benzene(DVB-196gm.)and DIBHP (98 gm.) are added over 90 minutes, while the emulsion is sparged with nitrogen. Over this period a slow exotherm occurs, and reaches a peak temperature of 66°C. when the addition is complete. The emulsion is maintained at this peak temperature for 1.5 hour.

The temperature is then readjusted to 60°C., and additional catalyst [1.96 gm. FORMOPON] and water (100 gm.) are added, followed by the addition of 43.4 lbs. of methyl methacrylate (MMA), 29.4 gm. DIBHP over a 90 minutes period, allowing to exotherm. The emulsion is sparged during the addition of the monomers. A slow exotherm occurs and reaches a peak temperature of 70°C. The temperature is maintained at this peak for 1 hour. The emulsion is then cooled and filtered.

The three stage, sequential polymer latex produced above (7,000 gm.) in 1,000 gm. of DI water is added to a 12-liter pressure reactor, while being sparged with nitrogen at 40°C. for 30 minutes. Additional catalyst (0.75 gm. of FORMOPON in 25 gm. DI water), and vinyl chloride (VC-250 gm.) is added over a 45 minute period, concurrently with 0.75 gm. of DIBHP, while maintaining the pressure at moderate levels. After allowing pressure to drop upon feed termination, DIBHP/0.5 gm. is added over a 30 minute period, after which the vessel pressure drops to zero and a vacuum is pulled to remove dissolved vinyl chloride. The resulting polymer is isolated from its emulsion by spray drying or by coagulation. It may also be isolated or separated by evporation or by coagulation.

The four stage sequential polymer produced above is blended along with suitable lubricants and stabilizers, with a suitable polyvinyl chloride. The resulting blend is mixed and milled for 5 minutes at 350°F. after fluxing. Sheets are formed by compression molding at 350°F. using a cycle of 3 minutes preheat and two minutes of 70 tons pressure. The sheets are cooled in a separate water cooled press under pressure. Properties of various modified polyvinyl chloride sheets of the present invention are set out in the following Table I. Testing is done by standard method: light transmission and haze are determined on ⅛ inch thick sheets.

The incorporation of a fourth stage of PVC onto a modifier comprising a three-stage heteropolymer of BA/S/BDDMA//S/BA/DVB//MMA, had the effect of reducing the haze level in the PVC sheet. Table I shows the effect that different amounts of PVC had on the optical and mechanical properties of transparent PVC sheet. The use of more than twenty parts of PVC was not advantageous in further improving any property. Twenty parts of PVC appears the optimum concentration for the modifier and the resulting four stage heteropolymer comprised three-stage polymer//Polyvinyl halide weight ratio of 150//20.

A reduction in percent haze occurred at a concentration of approximately 15 to 20 parts of vinyl chloride per 148 parts of Modifier K. It was found that the presence of a PVC layer on the modifier reduced the amount of extractable unbound polybutylacrylate and polystyrene in the heteropolymer. The Refractive Index match between stage (1+2+4) and the (PVC+stage 3) for 17.5% Modifier L* in PVC is the following:

TABLE III

| Stage | Refractive Index (Modifier L) | |
|---|---|---|
| | Measured | Calculated[a] |
| 1. 1+2 | 1.531 | 1.528 |
| 2. 1+2+3 | 1.519 | 1.515 |
| 3. PVC + PMMA from modifier. 17.5% modifier used | — | 1.537 |
| 4. 1+2+4 | — | 1.532 |

[a]/Calculations were based on literature values for refractive indices for PBA, PS, PMMA, & PVC. $n_{PBA}^{25} = 1.463$, $n_{PMMA}^{25} = 1.489$, $n_{PS}^{25} = 1.59-1.60$ (Encyl. Polym. Sci. & Tech., 1, 301, 13, 244). $n_{PVC}^{25} = 1.54$ (C.E. Schildknecht, Vinyl & Related Polymers, [1952] p. 429).

DEVELOPMENT OF MODIFIER N*

Heteropolymer M = BA/BDDMA//S/DVB//MMA = 48/0.48//50/0.625//50

TABLE I

EFFECT ON VINYL CHLORIDE ON PROPERTIES OF PVC SHEET

| Candidate Modifier No. | Parts of PVC[1] on Modifier | % Haze of PVC Sheet | Izod Impact Strength Ft.-Lb/Inch of Notch | | | |
|---|---|---|---|---|---|---|
| | | | R.T. | 60°F. | 50°F. | 40°F |
| A[2] | 0 | 18.0 | 8.8 | 8.4 | 1.1 | — |
| B | 6.4 | 14.5 | 22.4 | 8.5 | 6.4 | 1.3 |
| C | 11.1 | 11.0 | 18.0 | 8.0 | 5.3 | 0.7 |
| D | 16.4 | 12.0 | 22.1 | 14.8 | 4.3 | 1.0 |
| E | 18.2 | 10.5 | 21.9 | 13.9 | 6.0 | 1.0 |
| F | 19.6 | 12.0 | 22.6 | 11.1 | 8.1 | 1.1 |

[1] The amount of PVC is expressed as parts of PVC per 150 parts of three stages heteropolymer
[2] BA/S/BDDMA//S/BA/DVB//MMA=42.8/5.2/0.48//46.8/5.2/0.52//50

EFFECT OF PVC FOURTH STAGE ON PROPERTIES ON PVC SHEET MODIFIED WITH MODIFIER K*

The effects of poly(vinyl chloride) as a fourth stage for Modifier K are shown in Table II. *BA/S/BDDMA//S/BA/DVB//MMA=43/5/0.48//45/5/0.5//50

Amount of PVC Fourth Stage Needed for Heteropolymer M

The effect of the poly(vinyl chloride) as a fourth stage for the modifier can be found in Table IV. Twenty parts of vinyl chloride was chosen as the concentration needed for optimum clarity and impact strength.

* A four stage heterpolymer of composition, BA/BDDMA//S/DVB//MMA//VC = 48/0.48//50/0.625//50//20 was designated Modifier N.

TABLE II

EFFECT OF AMOUNT OF PVC ON THE MODIFIER ON THE IMPACT STRENGTH AND HAZE OF PVC SHEET

| Candidate Modifier | Amount of PVC in Modifier[1] | % Haze of PVC Sheet | Izod Impact Strength Ft.-Lb./Inch of Notch | | | |
|---|---|---|---|---|---|---|
| | | | R.T. | 60°F | 50°F | 40°F |
| G | 10.9 | 14.7 | 21.7 | 2.2 | 0.8 | — |
| H | 15.9 | 7.4 | 20.6 | 8.3 | 1.9 | 0.8 |
| I | 18.8 | 7.3 | 21.3 | 13.0 | 8.1 | 0.7 |
| J | 24.9 | 6.7 | 20.5 | 13.4 | 0.9 | — |
| K | 0 | 12.7 | 19.7 | 5.4 | 3.2 | 0.9 |

[1] Parts PVC/148 parts Modifier K

TABLE IV

EFFECT OF PVC CONCENTRATION IN MODIFIER ON PROPERTIES OF PVC SHEET

| Modifier | Amt. of PVC in Modifier* | % Haze of PVC Sheet | Izod Impact Strength Ft.-Lb./Inch of Notch | | |
|---|---|---|---|---|---|
| | | | R.T. | 30°F. | 40°F |
| S | 9.0 | 9.3 | 25.0 | 17.3 | 7.2 |
| T | 17.8 | 8.3 | 23.7 | 5.8 | 2.8 |
| U | 23.0 | 7.5 | 28.8 | 17.2 | 7.6 |

* Expressed as parts PVC/148 parts of Modifier M.

EXAMPLE II

PREPARATION OF EMULSION M

The procedure followed in Example I for the preparation of related four stage modifier L is generally applicable here. The recipe and steps are changed only as outlined below.

1. Procedure for Preparation of Heteropolymer M

| | Material | Amount, (g.) | |
|---|---|---|---|
| A | $H_2O$ | 2780 | (1) |
| | Sipon WD | 18.9 | (2) |
| | n-BA | 948 | (4) |
| | HOAc | 0.54 | (3) |
| | BDDMA | 8.48 | (5) |
| B | DIBHP | 2.37 | |
| | $H_2O$ | 237 | |
| C | Formopon | 1.89 | |
| | $H_2O$ | | |
| D | $H_2O$ | 3921 | |
| E | Formopon | 2.58 | |
| | $H_2O$ | 100 | |
| F | Styrene | 987 | |
| | DVB | 12.4 | |
| | DIBHP | 4.71 | |
| G | Formopon | 0.099 | |
| | $H_2O$ | 15.0 | |
| H | MMA | 987 | |
| | DIBHP | 1.48 | |

Procedure—To a 12-liter glass, round-bottom flask fitted with stirrer, condenser, thermometer, addition funnel, and sparge tube, was added in the order indicated. The mixture was sparged with nitrogen for two hours at 30°C. B was added, followed immediately by C. An exotherm occurred. This was held at peak temperature (65°C.) for 15 minutes. D was added slowly. The mixture was sparged with nitrogen for one hour, and the temperature of the emulsion was adjusted to 50°C. E was added, followed by F over two hour period. Polymerization was allowed to exotherm. The peak temperature was held at 60°C. for one hour. G was added, then H was added over 1½ hours. The peak temperature (63°C.) was held for 1 hour. The flask was cooled and the emulsion was filtered.

2. Procedure for Polymerization of Vinyl Chloride in the Presence of Precursor Emulsion

| | Material | Amount,(g.) |
|---|---|---|
| A | Precursor Emulsion | 8000 |
| B | Formopon DI $H_2O$ | 1.29 |
| C | Vinyl Chloride | 430 |
| D | DIBHP | 1.29 |
| E | DIBHP | 0.86 |

Procedure—To a 12-liter pressure reactor, A was added. The solution was sparged at 40°C. for ½ hour. The reactor was evacuated to 20" Hg was added, B followed by C over a two hour period while maintaining 40°C. (pressure is 50 psi). D was added over like period. At the end of feed, the pressure dropped to 20 psi. E was added over 1½ hour period. The reaction was allowed to proceed until pressure drops to 0 psi.

In another embodiment of the invention, modifiers are preparable which are useful in favorably improving the impact resistance of chlorinated polyvinyl halides, such as CPVC. They comprise: 10 to 50 parts of a two or three-stage polymer formed by emulsion polymerization of:

A. 10–70 parts of a rubbery first stage obtained by polymerizing a monomer charge of 80 to 100 weight percent of an alkyl acrylate, 0 to 20 weight percent of comonomer from one of methyl methacrylate and styrene, and 0.1 to 10 weight percent of a polyfunctional cross-linking monomer interpolymerizable therewith;

B. 0–30 parts of a second polymer stage polymer prepared by polymerizing a second monomer charge of 80–100 weight percent of one of an alkyl methacrylate and a vinyl aromatic monomer; and C. 30–90 parts of a third stage formed by polymerizing a third monomer charge of from 80 to 100 weight percent of a vinyl halide monomer polymerized on/or within the emulsion stages (A) and (B).

It is desirable to polymerize the second stage monomer in the presence of an effective amount of a polyfunctional cross-linking agent, such as the previously disclosed 1,3-butanediol dimethacrylate or divinyl benzene.

Any of the following heteropolymers will be incorporated into 50 to 90 parts chlorinated polyvinyl chloride.

EXAMPLE III

PREPARATION OF IMPACT MODIFIED CHLORINATED POLYVINYL CHLORIDE RESIN (Mod. V + CPVC)

A butyl acrylate latex (7075 gm.) is prepared as set forth for the stage (A) polymer of Example I, again using 1,3-butanediol dimethacrylate as the cross-linker. The solids are 19.6 percent and the particle size is approximately 1,300 A. Modifier V was then made by the following procedure:

1580 g. vinyl chloride 4.8 g. DIBHP 207 g. Formopon + 200 ml. DI water

The BA latex was sparged in a pressure reactor with nitrogen at 40°C. with stirring for ½ hour. The Formopon prepared by polymerizing a second monomer charge of 80-100 weight percent of one of an alkyl methacrylate and a vinyl aromatic monomer; and C. 30–90 parts of a third stage formed by polymerizing a third monomer charge of from 80 to 100 weight percent of a vinyl halide monomer polymerized on/or within the emulsion stages (A) and (B).

It is desirable to polymerize the second stage monomer in the presence of an effective amount of a polyfunctional cross-linking agent, such as the previously disclosed 1,3-butanediaol dimethacrylate or divinyl benzene.

Any of the foregoing heteropolymers will be incorporated into 50 to 90 parts of chlorinated polyvinyl chloride.

EXAMPLE III

PREPARATION OF IMPACT MODIFIED CHLORINATED POLYVINYL CHLORIDE RESIN (Mod. V + CPVC)

A butyl acrylate latex (7075 gm.) is prepared as set forth for the stage (A) polymer of Example I, again using 1,3-butanediol dimethacrylate as the cross-linker. The solids are 19.6 percent and the particle size is approximately 1,300 A. Modifier V was then made by the following procedure:

1580 g. vinyl chloride 4.8 g. DIBHP 207 g. Formopon + 200 ml. DI water

The BA latex was sparged in a pressure reactor with nitrogen at 40°C. with stirring for ½ hour. The Formopon solution was then added and the reaction kettle was immediately evacuated. The DIBHP was dissolved in the vinyl chloride monomer, and the mixture of monomer and initiator was slowly pumped into the reactor at a rate of 6 grams/minute over a four hour period. Pressures develop during the course of the polymerization which are maintained at 60–70 psi. The stirring rates were 150-200 rpm.

At the conclusion of the reaction, the pressure dropped to 10 inches of Hg in a period of approximately 1½ hours. Isolation in the laboratory was accomplished by freeze coagulation washing and air drying. The product was then vacuum dried at 45°C. for 12 hours. The performance of vinyl chloride containing interpolymers in chlorinated polyvinyl chloride was ascertained. Impact strength and DTUL of CPVC with 15 percent Modifier V is set forth in Table V.

TABLE V

IMPACT STRENGTH AND DTUL OF CPVC MODIFIED WITH 15% MODIFIER V (BA:BDDMA//VC 50:0.5//50)

| Sample No. | Izod Impact Strength ft. lbs./inch of notch | | DTUL (264 psi) °C |
|---|---|---|---|
| | Rt. | 0°C | |
| 1 | 14.7 | 1.7 | 101 |
| 2 | 14.3 | 0.9 | 103 |
| 3 | 13.0 | 1.6 | 101 |
| 4 | 15.7 | 1.3 | 100 |
| 5 | 14.5 | 0.8 | 99 |
| 6 | 14.8 | 1.7 | 102 |
| 7 | 12.6 | 1.9 | 98 |

Modifier V. From the Table it can be seen that CPVC sheet when modified with 15% exhibits a DTUL of approximately 100°C and shows an Izod impact strength at room temperature of about 14 ft. lbs./inch of notch. The reproducibility of these results should be noted.

What is claimed is:

1. A process for making impact modified polyvinyl halide polymers and copolymers comprising the steps:

A. forming a rubbery, first stage polymer by emulsion polymerization of a monomer charge of 70 to 99.9 weight percent of an alkylacrylate compound, the ester moiety having two to eight carbons; 0 to 30 weight percent of a vinylaromatic monomer interpolymerizable therewith; and 0.1 to 10 weight percent of a polyfunctional crosslinking monomer, weights based on the total weight of the step (A) monomer charge, B. adding to the resulting rubber polymer stage produced in step (A) from 70 to 99.9 weight percent of a vinyl-aromatic monomer, and 0 to 30 weight percent of an alkyl acrylate, wherein the alkyl group of said acrylate has about 2 to 8 carbon atoms interpolymerizable therewith, and 0.1 to 10 weight percent of a second polyfunctional crosslinking monomer weight based on the total weight of the step (B) monomer charge; and emulsion polymerizing the second monomer charge to form a second stage polymer on/or within the rubbery polymer stage produced in Step (A);

C. adding to the polymer resulting from steps (A) and (B) a third monomer charge of 80 to 100 weight percent of an alkyl methacrylate, wherein the alkyl groups have 1 to 4 carbon atoms, and emulsion polymerizing the third monomer charge to form a third stage polymer on the polymers in Steps (A) and (B), and D. adding to the resulting polymer resulting from Steps (A), (B) and (C), and based on the weight of said resulting polymer, a fourth monomer charge of 80 to 100 weight percent of a vinyl halide monomer, and emulsion polymerizing the fourth monomer charge to form a fourth stage polymer substantially entangled within the first and second stages resulting from Steps (A) and (B); wherein the first stage (A) monomers comprise about 20 to 45 parts, said second stage (B) monomers comprise about 20 to 35 parts, said third stage (C) monomers comprise about 20 to 35 parts, and said fourth stage (D) monomers comprise about 6 to 90 parts; and wherein the particle size of the resultant emulsion polymer is about 700–1,100 A.

E. adding the resulting heteropolymer to a polyvinyl halide polymer, whereby an impact resistant thermoplastic material is formed, said impact modified polyvinylhalide resin comprising 98 to 60 weight percent of said polyvinyl halide and about 2 to 40 weight percent of the heteropolymer.

2. An impact modified polyvinyl halide polymer or copolymer comprising 98 to 60 weight percent of polyvinyl halide polymer or copolymer and about 2 to 40 weight percent of an impact modifier comprising:

A. 20 to 45 parts of a rubbery first stage polymer formed by emulsion polymerization of a monomer charge of 70 to 99.9 weight percent of an alkyl acrylate compound, from 0 to 30 weight percent of a vinylaromatic monomer, interpolymerizable therewith, and with 0.1 to 10 weight percent of a first polyfunctional crosslinking monomer weight, based on the total weight of the monomer charge;

B. 20 to 35 parts of a second stage polymer substantially entangled on/or within the polymer (A) formed by emulsion polymerization in the presence of the polymer stage A, of from 70 to 99.9 weight percent of a vinyl aromatic monomer and from 0 to 30 weight percent of an alkyl acrylate wherein the alkyl group of said acrylate has about 2 to 8 carbon atoms, interpolymerizable therewith, and 0.1 to 10 weight percent of a polyfunctional cross-linking monomer, weight based on total monomer wherein the particle size of the resultant polymer is about 700–1,100 A charge;

C. 20 to 35 parts of a third stage polymer formed by emulsion polymerization in the presence of the stage (A) and (B) polymer products, and comprising 80 to 100 weight percent of an alkyl methacrylate, wherein the alkyl groups have about 1 to 4 carbon atoms; and D. 6 to 90 parts of a fourth stage polymer entangled within the products of Stages (A) and (B) and formed by emulsion polymerization in the presence of the polymer product of said Stages (A), (B), and C. and comprising 80 to 100 weight percent of a vinyl halide monomer.

3. The composition of claim 2 comprising 25 to 33 parts of the Stage (A) polymer, 25 to 33 parts of the Stage (B), 25 to 33 parts of the Step (C) polymer and 6 to 20 parts of the Step (D).

4. The composition of claim 2 in which the first stage polymer consists only of said alkyl acrylate and of the said first polyfunctional cross-linking monomer, and the second stage polymer consists only of said vinyl aromatic compound and said second cross-linking agent.

5. A composition of claim 2 in which the vinyl-halide monomer of Step (D) is vinylchloride.

* * * * *